Figure 1:
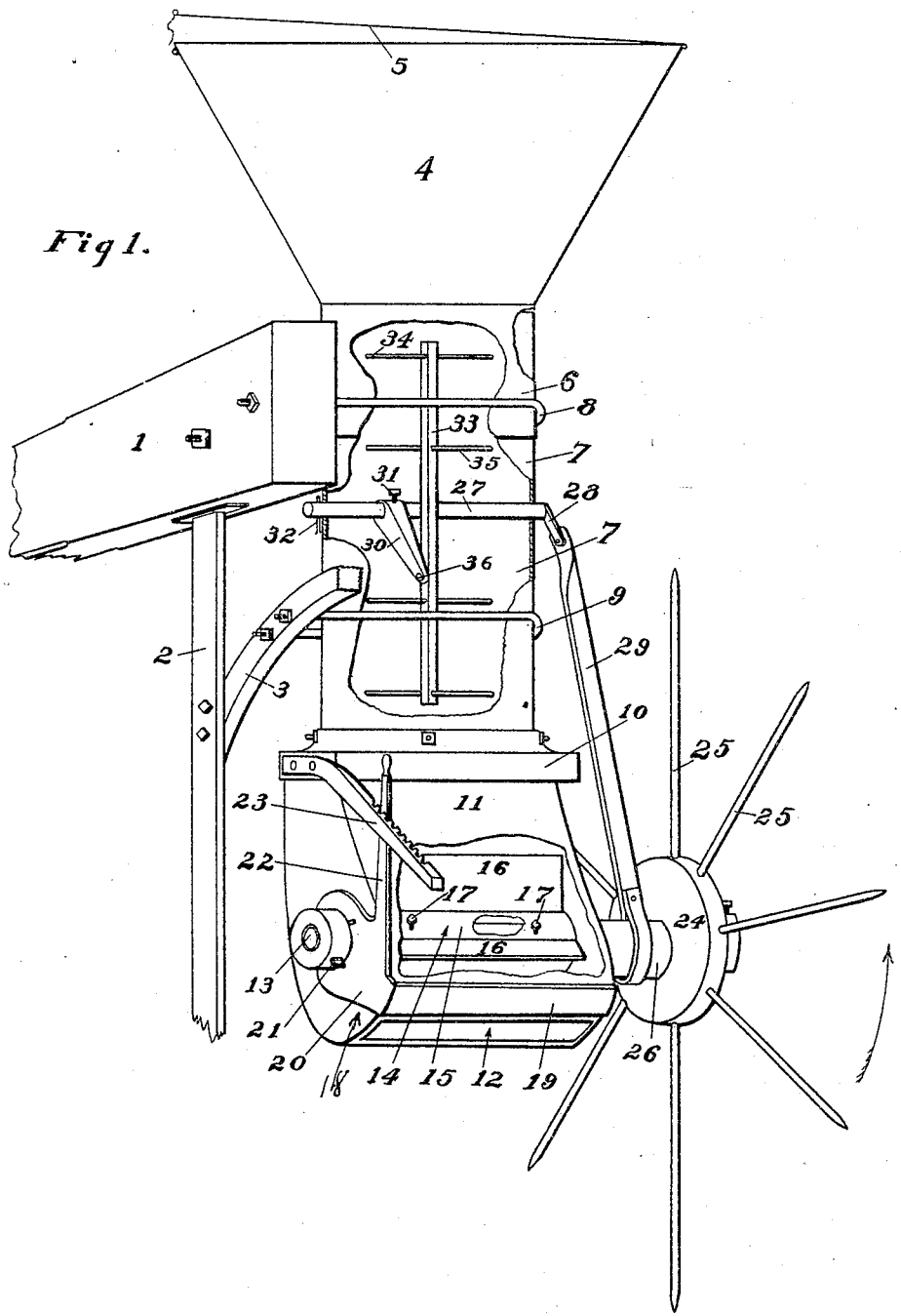

No. 773,616. PATENTED NOV. 1, 1904.
J. WILLSON.
FERTILIZER SOWER.
APPLICATION FILED DEC. 21, 1903.
NO MODEL. 2 SHEETS—SHEET 1.

Witnesses
H. W. Van Derveer.
G. T. Hackley

Inventor
James Willson.
by Townsend Bros.
Attys.

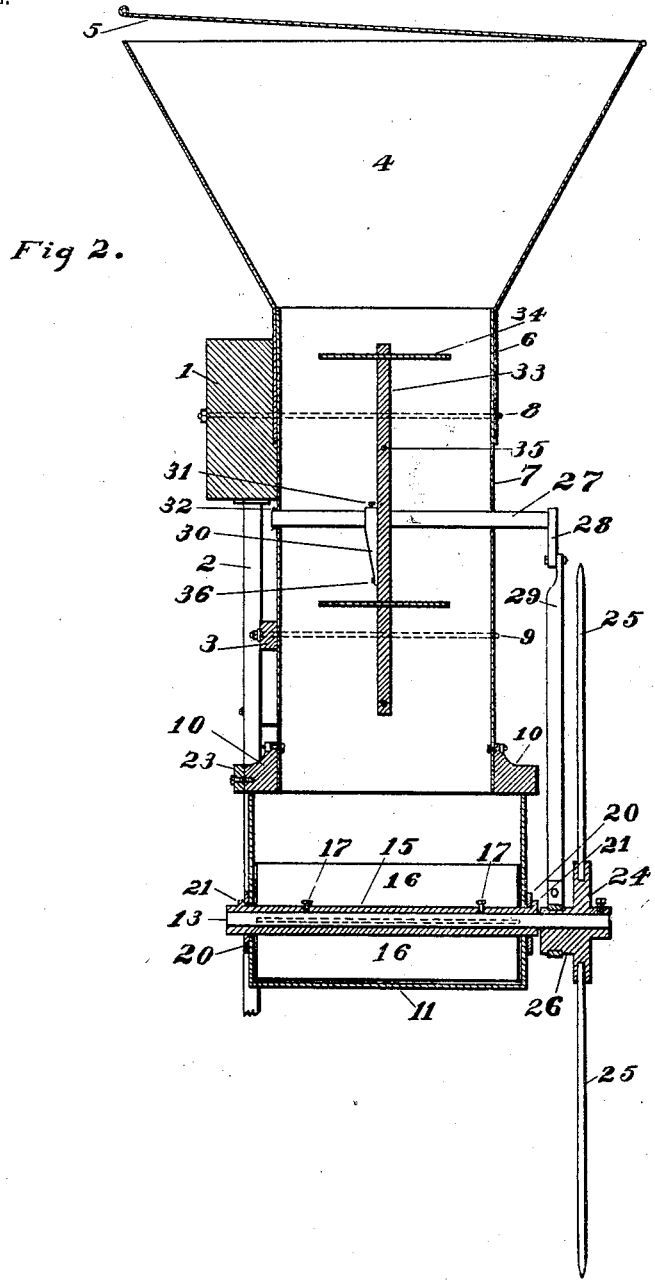

No. 773,616. Patented November 1, 1904.

UNITED STATES PATENT OFFICE.

JAMES WILLSON, OF PORTERVILLE, CALIFORNIA.

FERTILIZER-SOWER.

SPECIFICATION forming part of Letters Patent No. 773,616, dated November 1, 1904.

Application filed December 21, 1903. Serial No. 186,099. (No model.)

*To all whom it may concern:*

Be it known that I, JAMES WILLSON, a citizen of the United States, residing at Porterville, in the county of Tulare and State of California, have invented a new and useful Fertilizer-Sower Attachment, of which the following is a specification.

This invention relates to a machine adapted to be attached to a plow-beam and adapted to hold a supply of fertilizer and constructed to deliver fertilizer into the furrow made by the plow. As the fertilizer is deposited in one furrow it is covered by the dirt which falls into that furrow upon the formation of the next furrow.

The object of the invention is to provide a device of the character described which is automatic in action and which may be attached to a plow-beam of any ordinary design.

Another object is to provide means for preventing the clogging of the fertilizer within the hopper.

Another object is to provide means whereby the amount of fertilizer delivered from the hopper may be regulated.

Another object is to provide a machine of the character described which is simple in construction, of few parts, economical of construction, effective in operation, and durable in use.

Other objects and advantages will appear from the following description.

The accompanying drawings illustrate the invention, and referring to the same, Figure I is a perspective view of the machine attached to a plow. Only the portion of the plow-beam which embraces the parts to which the machine is attached is shown. A portion of the throat has been broken away to show the agitator, and a portion of the feed-box has been broken away to show the feeder. Fig. II is a vertical section taken through the hopper.

1 designates the plow-beam, having the standard 2, to which is attached one of the handles 3.

4 designates the hopper, which is provided with a hinged cover 5. The hopper 4 has a neck 6, which fits over the top of the throat 7, there being a U-bolt 8, which passes over the neck 6 and throat 7 and fastens the same to the beam 1. 9 is another U-bolt which fastens the lower portion of the throat to the handle 3.

Bolted to the lower part of the throat 7 is a reducer 10, and fastened to the reducer 10 is a feed-box 11, the lower part of which is provided with a mouth 12, through which the fertilizer is discharged.

A shaft 13 passes through the feed-box 11, and bolted to the shaft is a feeder 14, comprising a sleeve 15, having radial blades 16, which sweep around in the feed-box as the shaft 13 is rotated, the sleeve 15 being fastened to the shaft 13 by set-screws 17.

A feed-regulator 18 is provided, which comprises a lip 19, which extends across the feed-box externally of the same, being carried by wings 20, which are revolubly mounted on projecting ends 21 of the sleeve 15 and lie against opposite sides of the feed-box, as shown. Projecting up from one wing 20 is a lever 22, by means of which the lip 19 may be moved over the mouth 12 to close the same entirely or to contract the space through which the fertilizer passes, a notched spring-arm 23 being bolted or riveted to the reducer 10 for engaging the hand-lever 22 and holding the same in the position desired. A hub 24 is rigidly mounted on shaft 13, and projecting therefrom are spikes 25, there being an eccentric 26 preferably cast integral with the hub 24.

A rock-shaft 27 is mounted about midway of the length of the throat 7 and has an external arm 28, which is connected to the eccentric-rod 29, the latter comprising, preferably, a flat bar, the lower end of which is bent around the eccentric 26, as shown, so that as the eccentric 26 is turned the eccentric-rod 29 is actuated and the shaft 27 thereby rocked.

30 is an arm fastened to the rock-shaft 27 by a set-screw 31. The rock-shaft 27 may be held in place by a pin 32.

An agitator is provided within the throat 7, which comprises a vertical bar 33, which carries arms 34 and 35. The arms 35 are arranged at right angles to the arms 34, and the vertical bar 33 is pivotally attached to the arm 30 by a pin 36. The arms 34 may be formed of rods, which are driven through the bar 33, and the length of the rods should be somewhat less than the inside diameter of the throat 7, so that while they will guide the bar 33 in a general vertical movement by reason of their ends rubbing against the walls of the throat 7 they permit of a slight lateral movement of the same, necessitated by the arc of travel of the arm 30.

In operation the fertilizer is placed within the hopper 4 and falls down into the throat 7 and feed-box 11. As the plow moves forward the spikes 25 one after another catch in the ground and rotate the shaft 13 and cam 26, which sweeps the blades 16 around through the box 11 and forces out the fertilizer through the mouth 12 into the furrow left by the plow, and at the same time the agitator is reciprocated within the throat 7 through the medium of the eccentric 26, eccentric-rod 29, and shaft 27, so that the fertilizer within the throat is kept in motion and caused to feed down from the hopper into the feed-box 11.

Were it not for the agitator the fertilizer might clog within the throat 7. The action of the agitator obviates clogging of the fertilizer and promotes a uniform distribution of the fertilizer from the hopper to the feed-box, and its passage through the throat is greatly facilitated by the up-and-down movement of the agitator, which rakes the arms 34 and 35 through the fertilizer.

The fertilizer is distributed in a stream from the mouth 12, and the size of the stream delivered may be regulated by adjusting the lip 19 to the requisite position over the mouth 12. If desired, the lip may be moved to completely close the mouth 12 and prevent any of the fertilizer from being delivered from the machine.

While I have shown and described the preferred embodiment of my invention, it is evident that many changes and alterations may be made in the particular construction shown without departing from the spirit of the invention.

I have spoken of the machine as being particularly adapted for use with a plow; but it should be understood that the machine could easily be attached to other agricultural implements, such as a harrow, for instance.

What I claim is—

1. In a fertilizer-sower, a throat, a reducer fastened to the lower end of the throat, a feed-box attached to the reducer, a feeder in the feed-box, a rotatable device mounted on the feed-box operated by engagement with the ground for actuating the feeder, the feed-box having a mouth, wings pivotally mounted next to the feed-box, and a lip carried by the wings and movable over a mouth in the feed-box.

2. In a fertilizer-sower, a throat, a reducer fastened to the lower end of the throat, a feed-box attached to the reducer, a feeder in the feed-box, a rotatable device mounted on the feed-box operated by engagement with the ground for actuating the feeder, the feed-box having a mouth, wings pivotally mounted next to the feed-box, a lip carried by the wings and movable over a mouth in the feed-box, a hand-lever projecting from one of the wings, and a spring having notches for engaging the hand-lever.

3. In a fertilizer-sower, a throat, a feed-box attached to the throat, a shaft extending through the feed-box, a feeder mounted on the shaft within the feed-box comprising a sleeve having blades, a rotatable device mounted on the shaft and operated by contact with the ground for rotating the shaft, an agitator in the throat, an eccentric on the shaft, and means connecting the eccentric and the agitator for actuating the same.

4. In a fertilizer-sower, a throat, a feed-box attached to the throat, an agitator in the throat comprising a vertical bar with cross-arms, a rock-shaft in the throat, an arm on the rock-shaft connected to the vertical bar, a shaft extending through the feed-box, an agitator on the shaft comprising a sleeve having blades, an eccentric on the shaft, another arm on the rock-shaft, an eccentric rod connecting the eccentric with the said latter arm, and a rotatable device on the feed-box shaft operated by contact with the ground for rotating the shaft.

5. In a fertilizer-sower, a throat, a feed-box attached to the throat, an agitator in the throat comprising a vertical bar with cross-arms, a rock-shaft in the throat, an arm on the rock-shaft connected to the vertical bar, a shaft extending through the feed-box, an agitator on the shaft comprising a sleeve having blades, an eccentric on the shaft, another arm on the rock-shaft, an eccentric-rod connecting the eccentric with the said latter arm, a rotatable device on the feed-box shaft operated by contact with the ground for rotating the shaft, the feed-box having a mouth, a pair of wings mounted concentric with the feed-shaft, a lip carried by said wings and movable over said mouth, a hand-lever projecting from one of said wings, and a notched spring for engaging the hand-lever.

6. In a fertilizer-sower, a throat, a reducer bolted to the lower end of the throat, a feed-box depending from the reducer, an agitator within the throat, a shaft extending through the feed-box, a sleeve on the shaft, blades projecting from the sleeve, an eccentric on the shaft, a hub on the shaft, spikes projecting from the hub, and means connecting the eccentric with the agitator for actuating the same.

7. In a fertilizer-sower, a throat, a reducer bolted to the lower end of the throat, a feed-box depending from the reducer, an agitator within the throat, a shaft extending through the feed-box, a sleeve on the shaft, blades projecting from the sleeve, an eccentric on the shaft, a hub on the shaft, spikes projecting from the hub, means connecting the eccentric with the agitator for actuating the same, said feed-box having a mouth, a lip movable over the mouth, wings carrying said lip mounted on extended ends of the sleeve, one of said wings having a slot, and a boss on one of the extended ends of the sleeve.

In testimony whereof I have hereunto signed my name, in the presence of two subscribing witnesses, at Porterville, in the county of Tulare and State of California, this 14th day of December, 1903.

JAMES WILLSON.

Witnesses:
  JOHN R. JONES,
  ADOLPH D. WILLSON.